United States Patent
Kim et al.

(10) Patent No.: US 7,289,478 B1
(45) Date of Patent: Oct. 30, 2007

(54) METHOD AND APPARATUS FOR A FIXED WIRELESS BROADBAND ACCESS AND WIRELESS LAN INTEGRATION

(75) Inventors: Byoung-Jo J. Kim, Atlantic Highlands, NJ (US); John Jerome Skinner, Jr., Staten Island, NY (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/363,733

(22) Filed: Jul. 30, 1999

(51) Int. Cl.
H04Q 7/24 (2006.01)
H04Q 7/00 (2006.01)
H04B 7/212 (2006.01)

(52) U.S. Cl. .............. 370/338; 370/332; 370/347; 370/348

(58) Field of Classification Search ........... 370/276, 370/277, 278, 285, 338, 328, 324, 343, 332, 370/333, 282, 288; 455/554, 3.01, 422
See application file for complete search history.

(56) References Cited

U.S. PATENT DOCUMENTS

| | | | |
|---|---|---|---|
| 5,327,576 A * | 7/1994 | Uddenfeldt et al. ....... 370/333 |
| 5,602,854 A * | 2/1997 | Luse ..................... 370/313 |
| 5,682,379 A | 10/1997 | Mahany et al. |
| 5,684,801 A | 11/1997 | Amitay et al. |
| 5,696,903 A * | 12/1997 | Mahany ................... 709/228 |
| 5,706,428 A * | 1/1998 | Boer et al. .............. 370/342 |
| 5,732,077 A | 3/1998 | Whitehead |
| 5,796,727 A | 8/1998 | Harrison et al. |
| 5,822,361 A | 10/1998 | Nakamura et al. |
| 5,828,663 A | 10/1998 | Ikegami |
| 5,898,730 A * | 4/1999 | Hensley et al. .......... 375/224 |
| 5,898,904 A * | 4/1999 | Wang ..................... 340/7.27 |
| 5,930,247 A * | 7/1999 | Miller .................... 370/338 |
| 5,949,776 A * | 9/1999 | Mahany et al. .......... 370/338 |
| 6,035,183 A * | 3/2000 | Todd .................... 455/226.2 |
| 6,175,860 B1 * | 1/2001 | Gaucher ................. 709/208 |
| 6,356,537 B1 * | 3/2002 | Jaakkola ................ 370/310.2 |
| 6,363,482 B1 * | 3/2002 | Shani .................... 713/168 |
| 6,374,311 B1 * | 4/2002 | Mahany et al. .......... 710/18 |
| 6,377,782 B1 * | 4/2002 | Bishop ................... 455/3.01 |
| 6,600,734 B1 * | 7/2003 | Gernert et al. .......... 370/352 |
| 6,628,627 B1 * | 9/2003 | Zendle et al. ........... 370/310 |
| 6,654,344 B1 * | 11/2003 | Toporek et al. ......... 370/230 |
| 6,791,959 B1 * | 9/2004 | Palmer et al. .......... 370/332 |

* cited by examiner

*Primary Examiner*—Chirag G. Shah

(57) ABSTRACT

A method and apparatus for integrating Fixed Wireless Broadband Access (FWBA) and a Wireless Local Access radio Network (WLAN) is presented. An antenna or satellite dish leads to an RF (Radio Frequency) processor and modulator/demodulator component installed in a home or business which allows for receipt of an analog and/or digital signal sent by broadband transmission from a fixed base station. Integrated to the FWBA set-up is a transmitter/receiver linking a number of portable or stationary devices in a WLAN, allowing for seamless communication to and from the WLAN devices inside or outside of the home and/or business. Devices can be programmed to receive or transmit data according to location and channel conditions and signal strength inside and outside of the home or business.

7 Claims, 3 Drawing Sheets

METHOD AND APPARATUS FOR A FIXED WIRELESS BROADBAND ACCESS AND WIRELESS LAN INTEGRATION

BACKGROUND OF THE INVENTION

1. Field of the Invention

The present invention relates to a method and apparatus for a Fixed Wireless Broadband Access (FWBA) and Wireless LAN (WLAN) integration and, more particularly, to a method and apparatus for the integration of broadband RF (Radio Frequency) processing and modulation/demodulation components and a wireless local area network radio device.

2. Description of the Prior Art

As digital devices shrink in size, becoming more portable, and begin to incorporate multiple functions (e.g., cellular phones with Internet access), individuals are more apt to want to keep the device on their person and to use it all the time regardless of their location. Presently, however, many portable digital devices have a limited range of use because of factors such as signal interference and poor reception (i.e., signal strength), especially when in use in or upon entrance to a building or facility. Thus to use the device at home or work as readily as elsewhere, the need exists to integrate fixed wireless broadband access with a wireless local area network for seamless communication and transfers, without having to do an extensive re-wiring of the network setups.

Currently WLANs alone are being implemented and integrated in homes and businesses. For example, U.S. Pat. No. 5,696,903, issued Dec. 9, 1997 to Mahany, relates to the integration of two wireless local area networks which each exhibit substantially different characteristics. The first WLAN is made up of a radio unit infrastructure network and a portable computer. The second WLAN is made up of another portable computer and a number of peripheral devices with built-in transceivers. Coordination between the first and second WLAN is hierarchical in nature and is controlled by a singular radio transceiver using multiple communication protocols. Interference between each WLAN is prevented by a reservation access protocol. While communication within the transmission range of the radio unit infrastructure network is addressed between the WLANs, communication outside the range is not possible, thereby effectively limiting the mobility of the portable devices.

Another example, U.S. Pat. No. 5,706,428, issued Jan. 6, 1998 to Boer et al., relates to the transmission of data, using direct sequence spread spectrum coding, at different rates between multiple stations of a WLAN. To determine the data transmission rate between the stations, each data message includes a header having data fields which identify the bit rate and field length for the data portion of the message being sent. For inter-operability of the different stations of the WLAN, the message headers are all transmitted at a rate of 1 Mbps, regardless of the transmission speed of the rest of the message. Based on the data transmission rate contained in the header, and on channel conditions, a receiving station of the WLAN either acknowledges capability of receiving data at the rate specified or not. If no acknowledgment is sent, the transmitter resends the message at a lower rate. If an acknowledgment is sent, the transmitter sends the next message at the higher bit rate. There is, however, no provision for transmission of the messages when one of the stations is carried outside of the transmission range of the WLAN.

Yet another example, U.S. Pat. No. 5,602,854, issued Feb. 11, 1997 to Luse et al., relates to a WLAN between a computer terminal and one or more peripheral devices. The computer terminal and each peripheral device has attached to it a transceiver, in each of which a micro-processor resides. One of the transceivers, designated as a base unit, controls communication between the computer terminal and the peripheral devices of the WLAN according to an "Idle Sense" protocol. This protocol, however, requires the base unit to remain active at all times, thus requiring a great deal of power. Furthermore, such communication control is limited to the transmission range of the unit's transceiver and control is lost by the base unit if it is carried outside of the transmission range.

While the WLAN is being implemented in a variety of ways in the home and workplace, information flow to the network from the outside is often hubbed at a "low" point in the house or business structure. That is, cables and wires carrying information into the house or business structure are usually brought into, or connected to, the house or business at the ground floor or basement level. Alternatively, FWBA (also known as "wireless cable") is often brought into, or connected, to the house or business structure at a "high" point. That is, FWBA is attained through the use of antennas and/or satellite dishes usually mounted on the roof of the house or business structure and then hard-wired to the device. Thus the information distribution points, or connections from the outside (i.e., antennas, dishes, cables, etc.), are diametrically placed apart from one another. To combine the two requires extensive re-wiring of the home or business, which is intrusive and expensive. Furthermore, those devices designed to use the FWBA which are not wired in the home or business structure often have difficulty receiving data transmissions inside of the home or business due to channel conditions or signal degradation (i.e., interference, etc.).

Thus as can be seen, there remains a need for the seamless integration of FWBA and a WLAN which will provide for uninterrupted communication service regardless of location and which will eliminate any need for expensive and interruptive re-wiring of a home or business.

SUMMARY OF THE INVENTION

Accordingly, broadband radio signals, either analog or digital, are transmitted between radio antenna base stations or satellites and a fixed antenna or satellite dish mounted in a home or business. In the home or business the radio signals are processed and modulated/demodulated by RF processing and modulation/demodulation components, and then sent to or received from a wireless local area network radio transmitter/receiver. The WLAN radio transmitter/receiver is directly built onto (i.e., integrated with) the RF processing and modulation/demodulation components. The radio signals are transmitted to or received by the WLAN radio transmitter/receiver by one or more portable or stationary devices comprising the WLAN in the home or business. For transmission and receipt of the signals, each device has a transmitter/receiver and can be programmed to transmit and receive the signals on the basis of channel conditions and signal strength inside and outside of the home or business.

The present invention, including its features and advantages, will become more apparent from the following detailed description with reference to the accompanying drawings.

DETAILED DESCRIPTION

Figure 1:
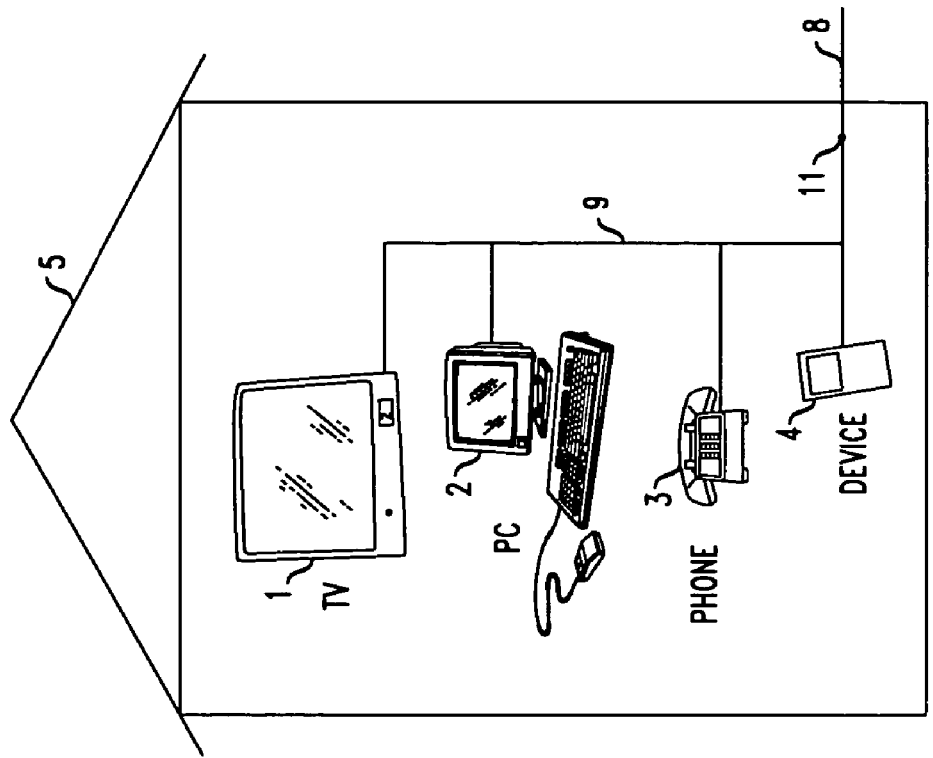
FIG. 1 illustrates wiring and/or cable schematics in a home and/or business, according to the prior art.
Figure 1:
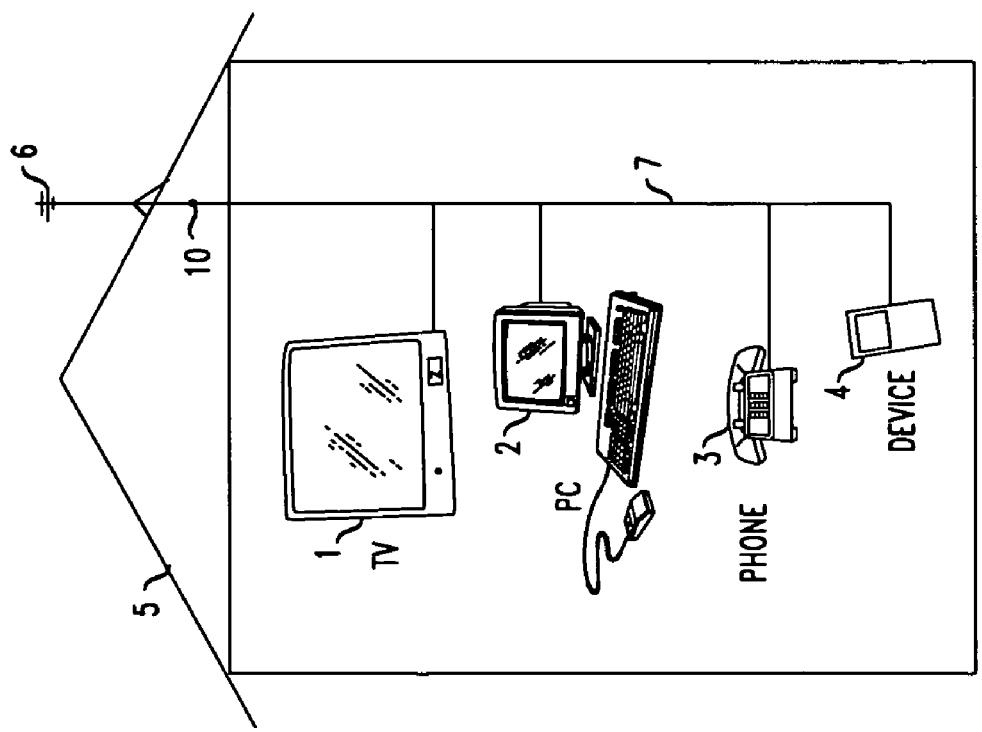

Referring to FIG. 1, wiring and/or cable schematics in a home and/or business 5 may be configured such that television 1, telephone 2, computer 3, and electronic device 4 are connected to outside data communication sources (not shown) via either antenna 6 or cable 8. Communications to antenna 6 are, of course, through known wireless means. Communications via cable 8 are, of course, over known land line based means. Further, it is to be understood, of course, that the data communication sources may be any device or construction capable of transmitting broadband radio frequency signals, such as, for example, a transmission tower or satellite.

In the case where data communication is via antenna 6, connections to television 1, telephone 2, computer 3, and electronic device 4 through information distribution point 10 is by cable(s) 7. Each device connected to antenna 6, it should be noted, can have its own cable and/or wiring 7 such that communication lines are not crossed and interference is minimized. Further, it should be noted, of course, that antenna 6 can instead be a satellite dish. Satellite dish and/or antenna 6 are usually mounted on the roof of home 5. This causes the communication hub and information distribution point 10 to be at a high point in the home.

In the case where data communication is via cable 8, connections to television 1, telephone 2, computer 3, and electronic device 4 are through information distribution point 11 by cable 9. Once again, each device may have its own cable and/or wiring 9 such that communication lines are not crossed and interference is minimized. This wiring schematic set-up causes the communication hub and information distribution point 11 to usually be at a low point in home 5. It is to be noted, of course, that cable 9 connecting each of the electronic devices may be a copper and/or optical fiber, or may instead be wireless via radio. Thus, as can be seen, as each of the information distribution points 10 and 11 are usually hubbed to the outside data communication sources at different points, it makes it difficult and expensive to provide wiring between the two to connect them.

Figure 2:
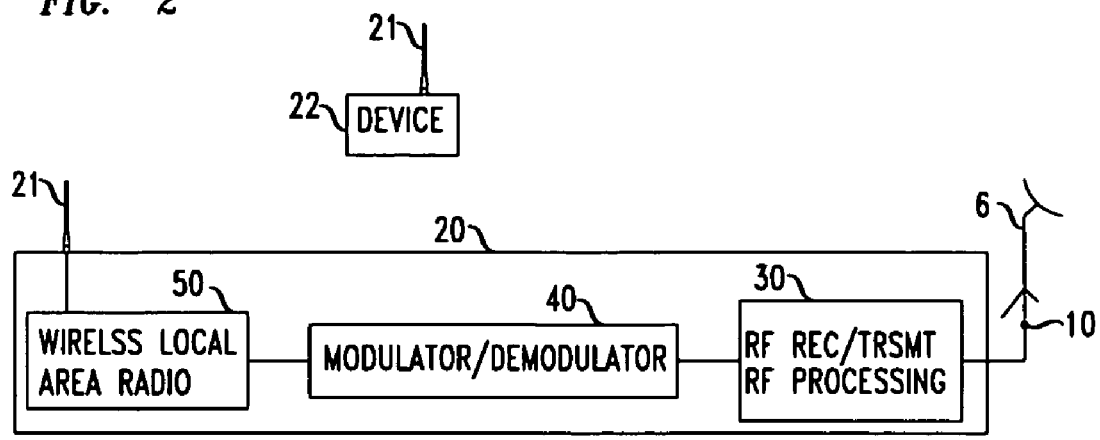
FIG. 2 illustrates FWBA and WLAN component integration, according to an embodiment of the present invention.
Figure 3:
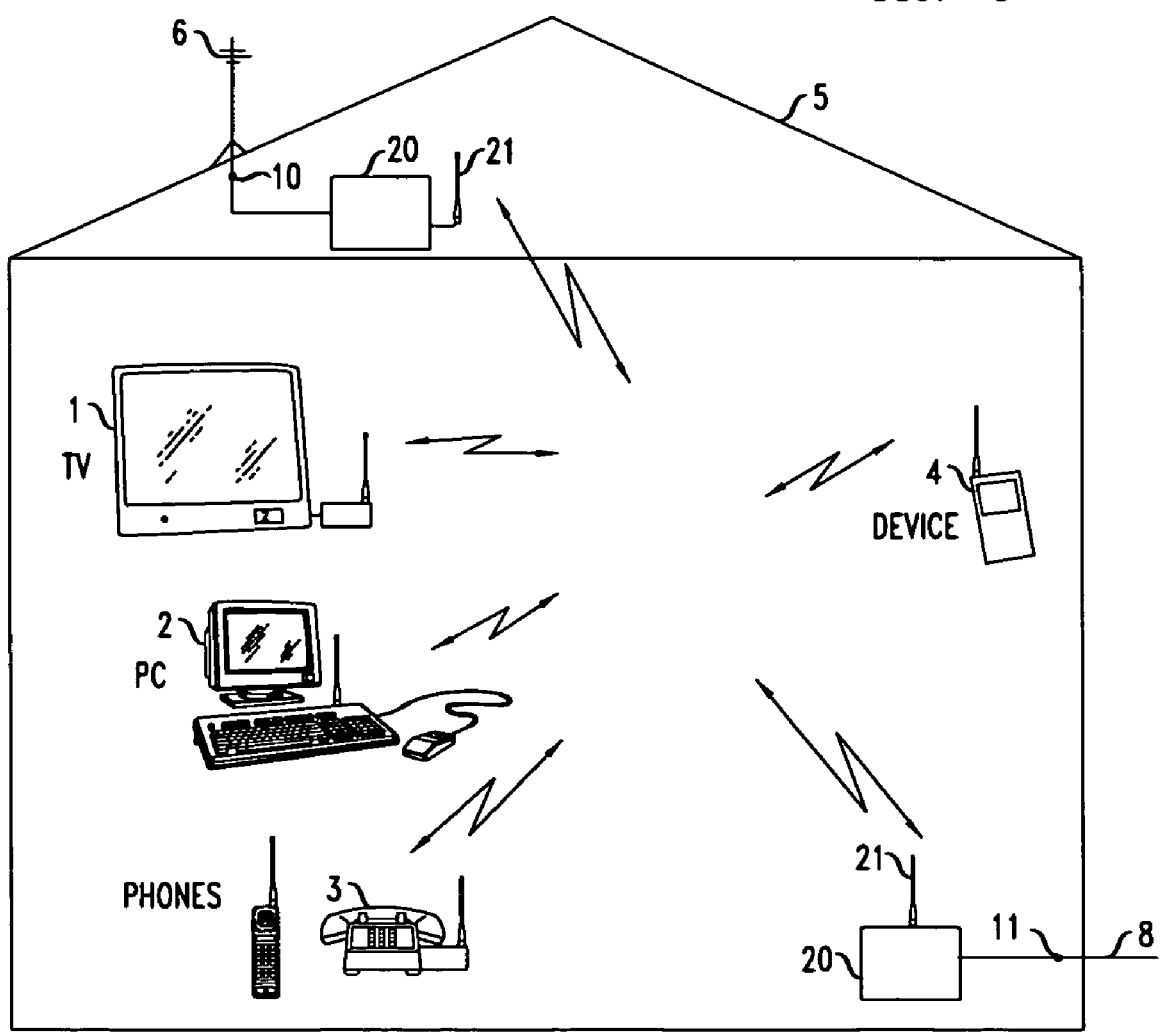
FIG. 3 illustrates a schematic of an integration of the FWBA and WLAN in a home and/or business, according to an embodiment of the present invention.
Figure 4:
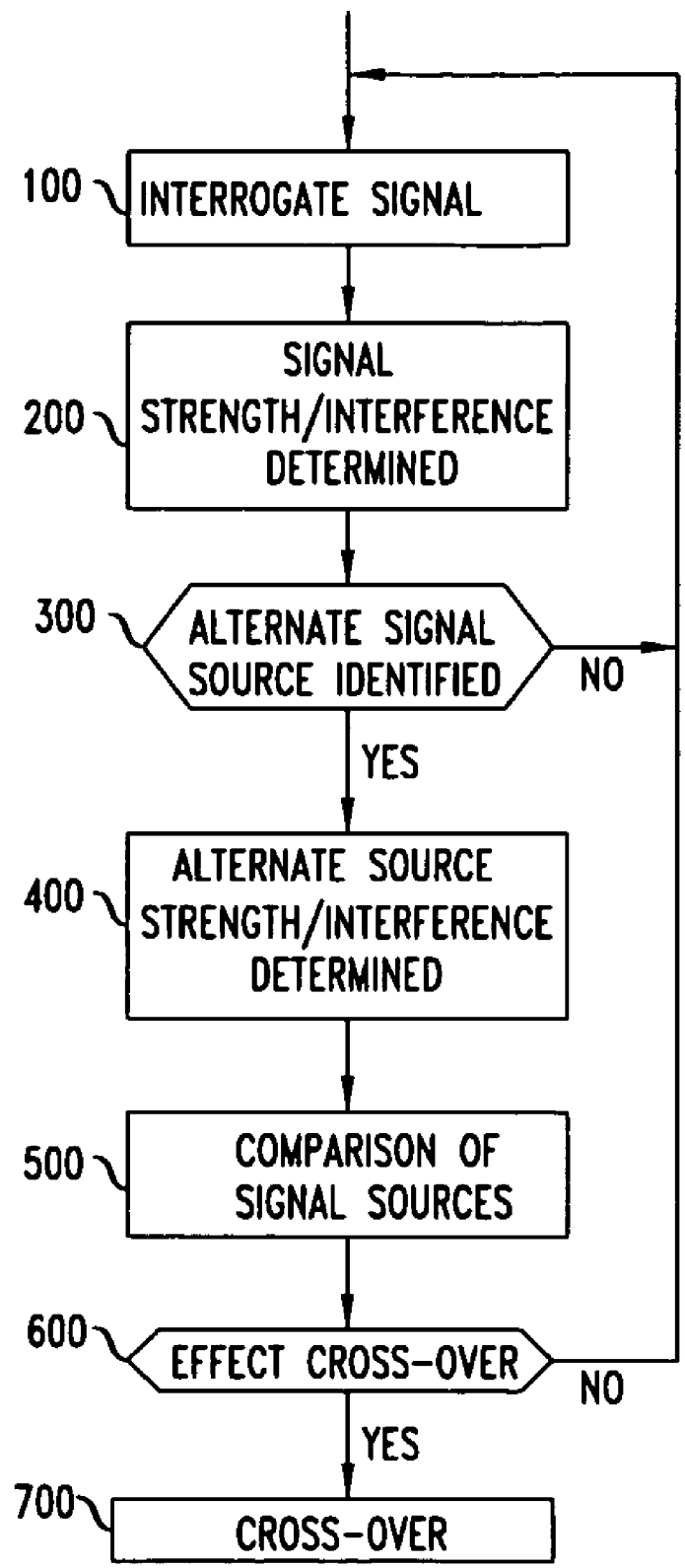
FIG. 4 illustrates a flow chart for a transfer protocol which provides seamless communication in movement between indoor and outdoor locations, according to an embodiment of the present invention.

FIGS. 2 through 4 illustrate a method and apparatus for integrating FWBA and a WLAN. Referring specifically now to FIG. 2, satellite dish and/or antenna 6 receives communication from an outside data communication source (e.g., a broadband radio frequency transmission tower, a satellite, etc., not shown) via known wireless means. The communication data is then transferred through information distribution point 10 to a FWBA and WLAN integrator 20. Contained within the integrator 20 is an RF processing component 30, a modulator/demodulator component 40 and a wireless local area radio component 50. Power is supplied to the integrator 20 through power source 60. Communication data is passed from information distribution point 10 to the integrator 20, processed by the RF processing component 30, modulated/demodulated by the modulator/demodulator component 40 and passed to the wireless local area radio component 50. At this point, the communication data is transferred to antenna 21 for transmission to electronic device 22. Electronic device 22 is capable of receiving the communication data transmitted from antenna 21 through its own antenna and receiver. It is to be noted, of course, that electronic device 22 can be any sort of electronic device (i.e., such as television 1, telephone 2, computer 3 and an alternative electronic device 4 as shown in FIG. 1), portable or not. Thus, as can be seen, satellite dish and/or antenna 6 can receive various types of communication data transmissions from the various outside data communication sources, and then transmit the communication data by antenna 21 throughout the home and/or business 5 to electronic device 22. For instance, television signals can be received by the antenna 6 and transmitted by the integrator 20 to the television 1 or computer 3 to be watched and, perhaps at the same time, electronic data (e.g., E-mail) can be received by the antenna and transmitted by the integrator 20 to either the television 1 or computer 3 for reading, etc.

Referring now to FIG. 3, an exemplary embodiment of an integration of FWBA and a WLAN in home and/or business 5 is shown. Antenna 6 receives data communications transmitted from an outside data communication source (e.g., a broadband radio frequency transmission tower, a satellite, etc., not shown) and transmits this data through information distribution point 10 to the integrator 20. It is to be noted, of course, that integrator 20 may be mounted either inside the roof (e.g., in the attic) and connected to antenna 6 by wire and/or cable, or may be mounted on the roof outside of home and/or business 5. Integrator 20 transmits the data communication by wireless means through radio antenna 21 to television 1, telephone 2, computer 3 and/or electronic device 4. Each of these receiving apparatus has built in and/or on to them, respectively, a receiver antenna. It is to be noted, of course, that communication may be bi-directional in that communication data may also travel from television 1, telephone 2, computer 3 and/or electronic device 4 to the integrator 20 for transmission by satellite dish and/or antenna 6 to the outside. In this manner then, re-wiring of a home and/or business is not necessary each time a new electronic device is purchased, and thus "golden installation" may be achieved in that a consumer may buy integrator 20 and simply plug it in or add it on to satellite dish and/or antenna 6. It is to be noted, of course, that the present invention is not to be limited to either rooftop and/or attic mounting, but that the outside data communication radio signals may be hubbed at a point that is lower in the home and/or business 5. For instance, information distribution point 10 may be hubbed at a lower point in the home. The satellite dish and/or antenna 6 may be placed in a window or at ground level (inside or outside home and/or business 5) and the information distribution point may be hubbed as in FIG. 1, as in the case of the location of information distribution point 11.

Further then, it is to be noted that alternatively, or in conjunction with the above, in the case where data communications enter the home and/or business 5 through distribution point 11 via cable 8, the integrator 20 may be connected at this point. Cable 8, as does satellite dish and/or antenna 6, can act as a conduit for the data communication from the outside data communication source. As above, integrator 20 transmits the data communication by wireless means through radio antenna 21 to television 1, telephone 2, computer 3 and/or electronic device 4. Also, as above, communication may be bi-directional.

Referring now to FIG. 4, a flowchart for a transfer protocol providing seamless communication in movement between indoor and outdoor locations is shown. Consumers who will use their portable devices will want to use the devices inside and outside of the home 5 without communication interruptions. Often consumers find that their electronic devices are incapable of transmitting and/or receiving communication signals indoors or outdoors due to lack of signal strength or interference. Seamless communication is thus provided in that each electronic device 22 can be programmed to receive signals from either a satellite and/or fixed ground antenna outside or a WLAN radio inside. To accomplish this, in the first step, step 100, the integrator 20 sends out an interrogation signal to all electronic devices within its transmission range. Such interrogation signal is for determining which electronic devices are within the integrator's transmission range, and for allowing information relating to signal strength, channel interference, and alternate signal channel sources to be passed between the integrator and the electronic device.

In step 200 then, the current signal strength and channel interference of the signal channel through which data is being transmitted and/or received is measured. For instance, if the device is a cellular telephone and is currently transmitting and receiving data comprising a telephone conversation via a FWBA, such as from an antenna tower or satellite, the cellular telephone will measure and keep track of the strength and interference of the current signal from the antenna tower or satellite source. The cellular telephone will send such information to the integrator during an interrogation when the cellular telephone is carried into range of the integrator.

In step 300, the integrator and/or the device then determine if there are any alternate signal channel transmission/reception sources for the signal channel through which the data can be transmitted and/or received. For instance, the cellular telephone device, having measured the strength and/or interference of the channel strength from the FWBA source, will determine if an alternate signal channel source, such as a WLAN is available. This situation would arise when the device was carried from outdoor to indoor (i.e., into a home and/or business). It is to be understood, of course, that the opposite situation could also occur. That is, the cellular telephone device could be transmitting/receiving in an indoor WLAN environment and be carried outside to a FWBA environment. Further, it is to be understood that if no alternative signal channel source is identified, the step can be repeated.

At this point then, in step 400, if another signal source is identified, a determination of that signal source strength and channel interference is performed. For instance, if the cellular telephone device was carried indoors from the FWBA signal channel source, and the WLAN signal channel source was identified as being present, the integrator and/or cellular telephone device will measure the signal strength and channel interference for the WLAN source.

In step 500 then, a comparison of the two (or more) signal channel sources is carried out to determine which signal channel source is a better source through which to carry on the transmission and/or reception of the signal carrying the data. Such comparison can be accomplished by simply comparing and contrasting the two separate measurements taken of the two signal channel sources.

Having compared the two, in step 600, a determination as to which signal channel source is better to carry the signal is made. If the signal strength and channel interference are better from the alternate source, then crossover to that communication source is effected in step 700. If channel condition and signal strength are not better, then communication source crossover is not performed and the integrator and/or device can return to step 100 to repeat the process. For instance, continuing with the above example, if in moving from outdoor to indoor, the integrator and/or the cellular telephone device identify the WLAN signal channel source and determine that the alternate indoor WLAN source is better, crossover from the FWBA source to the WLAN source is effected. If the identified alternative WLAN source is not better than the FWBA source, then the integrator and/or the cellular telephone device re-measures and re-determines the signal strength and channel interference of each of the signal channel sources.

It is to be noted, of course, that such communication source crossover may occur a number of times and for either direction of movement (i.e., going inside or outside). Further, if any communication source is lost and/or there is an interruption in any step of the process, the integrator and/or device can begin again at step 100. Thus it is to be understood, of course, that steps 100 through 700 can be automatically continuously repeated, or repeated on demand by the consumer or upon a particular catalyst.

Furthermore, it is to be understood that different frequency channels may be used. For instance, a cellular telephone conversation may be carried out using one channel over FWBA and on a separate and distinct channel on the WLAN. Identification of the appropriate channels over which the conversation is being carried may be accomplished by using embedded data identifier tags in the conversation data.

Also furthermore, it is to be understood, of course, that the integrator and the electronic device can each be programmed with the indoor/outdoor communication transfer protocol so that they act in conjunction with one another or separately. If the integrator alone is programmed to monitor signal strength and channel interference in the home and/or business, the integrator effects signal channel source crossover by sending such instructions to the electronic device. The integrator will get information, of course, from the electronic device, and determine its relative location, by periodically interrogating the device.

In this manner then, an electronic device 22 may be used either in or near a home and/or business under the FWBA and WLAN integration, according to the present invention, or may be used outside of the communication range of the integrator 20 when at a distance from the home and/or business. Communication switch-over may be made to and from a land-based antenna tower or satellite for normal FWBA.

As can be seen by the above invention, expensive and intrusive rewiring of the home and/or business is not necessary through the integration of FWBA and a WLAN according to the present invention. Instead all that is needed is the installation of the integrator as described above. Further, seamless communication can be achieved both inside and outside of the home allowing for freedom of movement by the consumer.

In the foregoing description, the method and apparatus of the present invention have been described with reference to a number of examples that are not to be considered limiting. Rather, it is to be understood and expected that variations in the principles of the method and apparatus herein disclosed may be made by one skilled in the art and it is intended that such modifications, changes, and/or substitutions are to be included within the scope of the present invention as set forth in the appended claims. The specification and the drawings are accordingly to be regarded in an illustrative rather than in a restrictive sense.

What is claimed is:

1. A method of integrating fixed wireless broadband access associated with a building and a local area network, comprising the steps of:
   receiving a fixed wireless broadband signal from a source outside the building, which signal is characterized by a first communication protocol;
   demodulating the fixed wireless broadband signal, processing the demodulated signal to obtain a user signal, and re-modulating the user signal to form a converted signal that follows a second communication protocol that is different from the first communication protocol; and
   transmitting the user signal to an electronic device via the local area network within said building when said electronic device is conditioned to receive signals via said local area network in accord with said second protocol, and refrains from transmitting said user signal to said electronic device when said electronic device is conditioned to receive signals via other than said local area network, even when said electronic device is found within said local area network.

2. The method according to claim 1, further comprising a step of determining whether to condition said electronic device to receive signals via said local area network, or via said other than said local area network.

3. The method according to claim 2, wherein said electronic device, when conditioned to receive signals via other than said local area network, is conditioned to receive signals from said source directly.

4. The method according to claim 1, wherein the step of receiving is performed on signals received by an antenna, or a satellite dish.

5. The method according to claim 1, wherein said local area network is wireless.

6. A method executed in a mobile user device comprising the steps of:
   first determining a signal strength and a channel interference level for said user device communicating with a source over a first channel that includes a local area network within a building and a broadband wireless channel that couples said local area network to said source via a fixed broadband wireless access means;
   second determining a signal strength and a channel interference level for communicating with said source over a second channel that is distinct from said first channel, where said user device employs a first protocol when communicating via said first channel and employs a second protocol that is different from said first protocol when communicating via said second channel;
   making a determination, based on said first determining and said second determining, as to whether the second channel is a higher quality communication channel than the first channel; and
   causing said user device to communicate over said second channel when said determination is in the affirmative, and to communicate over said first channel when said determination is in the negative.

7. The method according to claim 6, further comprising the step of:
   interrogating said user device to pass information relating to the at least some of said steps of determining.

* * * * *